Oct. 16, 1951 W. P. OSGOOD 2,571,159
POWER TRANSMISSION MECHANISM
Filed Feb. 2, 1950

INVENTOR
WALTER P. OSGOOD,
by Wright, Brown, Quinby & May
ATTYS

Patented Oct. 16, 1951

2,571,159

UNITED STATES PATENT OFFICE 2,571,159

POWER TRANSMISSION MECHANISM

Walter P. Osgood, Malden, Mass.

Application February 2, 1950, Serial No. 142,043

2 Claims. (Cl. 74—751)

This invention relates to a mechanism for transmitting power from an input or drive shaft to an output or driven shaft, the two shafts being so connected that the ratio of their revolutions per minute may vary from 0:1 to 1:1 through an infinite number of intermediate values. Thus if this mechanism is connected between an output shaft and a rotating input shaft, the former may rotate at any speed from nothing to that of the input shaft.

As hereinafter described in more detail, the invention may be embodied in a frame which is secured to the end of the input shaft to rotate therewith. The input shaft may, for example, be the crank-shaft of a motor. The frame carries a gyro rotor which is rotatably mounted therein so that its axis of rotation is perpendicular to that of the housing and input shaft. Hence, when the housing rotates, the gyro rotor turns end over end while being free to rotate on its own axis. The rotor is positively connected to the output shaft by mechanical means which are so arranged that when the housing and output shaft rotate together in a 1:1 ratio, the rotor does not turn on its own axis, but when the rotation of the output shaft is less than that of the housing, the rotor is compelled to rotate on its axis at a speed proportional to the difference of speeds of the housing and output shaft.

For a more complete understanding of the invention, reference may be had to the following description thereof and to the drawing, of which—

Figure 1:
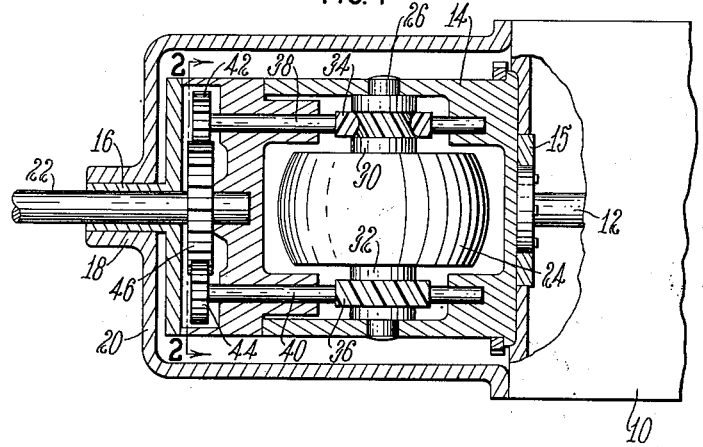
Figure 1 is an elevation of an embodiment of the invention, partly broken away to show in section.

In the drawing 10 represents the crank case of a prime mover such as a gasoline motor having a crank shaft, the end of which is indicated at 12. To this crank shaft is fixed an end of a frame in the form of a cylindrical housing 14 which rotates with the input shaft 12 and may be journalled in a suitable bearing 15 in the crank case. The cylindrical housing 14 and its contents thus may serve as a flywheel for the motor. The rear end of the housing 14 may be provided with a tubular projection 16 which is journalled in a bearing 18 of a stationary housing 20, a portion of which is indicated in Figure 1. The projection 16 also serves as a bearing for the forward portion of an output shaft 22 which is coaxial with the housing 14 and the input shaft 12.

Within the frame or housing 14 is mounted a gyro rotor 24. This may conveniently be in the form of a central zone of a sphere. The rotor is provided with a shaft which may be integral therewith, the end portions of the shaft being journalled in suitable bearings of the side walls of the housing 14 in such a manner that the axis of rotation of the gyro rotor is neither co-axial with nor parallel to that of the shafts 12 and 22. As shown, the rotative axis of the rotor is perpendicular to that of the shafts 12 and 22, this being desirable for reasons of simplicity, compactness and effectiveness, but the invention includes any non-parallel arrangement of the rotor axis, whether at a skew angle to the output shaft axis or offset therefrom so as not to intersect it, as it is evident that if the rotor is mounted in the rotatable frame 14 with its axis not parallel to that of the frame, simultaneous rotation of the rotor and the frame will necessarily result in precessional forces tending to stop the rotation of the rotor if the rotation of the frame is continued by impresed torque from the input shaft to which it is secured.

Figure 2:
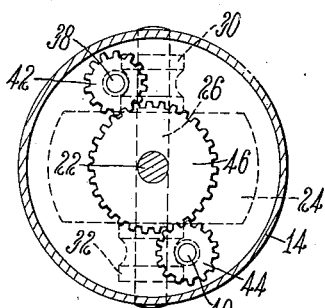
Figure 2 is a section on the line 2—2 of Figure 1.

The gyro rotor 24 is positively connected to the output shaft 22 by any suitable mechanical means. For example, a pair of worm gears 30 and 32 are mounted on the shaft 26 on either side of the rotor, these gears meshing respectively with worms 34 and 36 which are mounted on a pair of auxiliary shafts 38 and 40. These auxiliary shafts are journalled in the housing 14 and are parallel to the axis of the shafts 12 and 22. They are also symmetrically arranged with respect to the latter axis so as to preserve a dynamic balance in the housing 14 as a whole. On the ends of the shafts 38 and 40 respectively are mounted pinions 42 and 44, both of which mesh with a gear wheel 46 mounted on the output shaft 22 and must therefore rotate in the same direction. The worm gearing 30, 32, 34 and 36 is so arranged, as indicated in Figures 1 and 2, that the pinions 42 and 44 rotate in the same direction.

It is evident that when there is relative rotation between the input shaft 12 and the output shaft 22, the pinions 42 and 44 and the shafts on which they are mounted will rotate, thus causing the gyro rotor 24 to rotate on its own axis. When, however, the shaft 22 rotates as a unit with the housing 14 and input shaft 12, there will then be no rotative movement of the rotor about its own axis.

If the mechanism is used as a power transmitting mechanism in an automobile, proper connections between the shaft 22 and the vehicle wheels will be provided in the usual manner, such connections including a reversing mechanism and a clutch (not shown) by which the output shaft can be disconnected from the vehicle wheels.

Assuming that the motor, of which the shaft 12 is a part, is started at slow speed, if the output shaft 22 is held stationary, the rotation of the input shaft and housing will result in the pinions 42 and 44 walking about the gear wheel 46 and causing the rotation of the gyro rotor on its own axis. If the motor is speeded up, the gyroscopic forces will result in an increasing torque on the output shaft until a speed-to-load relationship is reached at which the input and output shafts will rotate together at a 1:1 ratio until the input speed-to-load ratio falls below a critical value, whereupon rotation of the rotor 24 will resume in proportion to the difference of speeds of the shafts 12 and 22.

Figure 3:
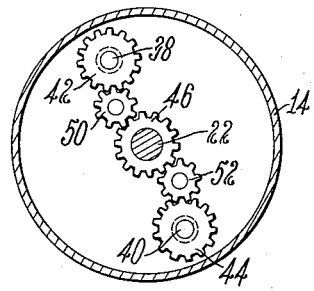
Figure 3 is a sectional view similar to Figure 2 but of a modified form of the invention.

A slight modification of the invention is illustrated in Figure 3, the difference between this form of the invention and that shown in Figure 2 being that the pinions 42 and 44 instead of meshing directly with the gear wheel 46 on the shaft 22 are connected to the gear wheel 46 through intermediate pinions 50 and 52. This makes possible the use of a smaller gear wheel 46 and consequently a smaller rotational speed of the gyro rotor in comparison with the speed of rotation of the shaft 22 relative to the housing 14.

The drawing is somewhat diagrammatic in character, details such as bearings being conventionally shown. The relative sizes of the parts are not necessarily significant and may be varied according to the requirements of any given installation.

I claim:

1. Mechanism of the class described comprising an input shaft, an output shaft coaxial therewith, a frame secured to said input shaft to rotate therewith, a gyro rotor having a shaft journalled in said frame with its axis of rotation perpendicular to the axis of rotation of the input shaft and frame, two auxiliary rotatable shafts journalled in said frame, said two shafts being parallel to the axis of rotation of the frame and symmetrically arranged with respect thereto, gear connections between said auxiliary shafts and rotor for rotation of both auxiliary shafts in the same direction and at the same speed when the rotor rotates on its axis, a gear wheel mounted on said output shaft, and a pinion mounted on each auxiliary shaft and meshing with said gear wheel.

2. Mechanism of the class described comprising a cylindrical rotatable housing, an input shaft secured to an end of said housing and coaxial therewith, an output shaft coaxial with said housing and journalled in the other end thereof, a gyro rotor within said housing having a shaft journalled in the side walls thereof, the axis of rotation of said gyro being perpendicular to the axis of rotation of the housing, two auxiliary shafts journalled in said housing and parallel to the axis thereof, worm gears on said gyro shaft, worms on said auxiliary shafts meshing with said worm gears, a pinion on each said auxiliary shaft, and a gear wheel on said output shaft meshing with said pinions.

WALTER P. OSGOOD.

REFERENCES CITED

The following references are of record in the file of this patent:

UNITED STATES PATENTS

| Number | Name | Date |
|---|---|---|
| 1,360,216 | Hunt | Nov. 23, 1920 |
| 1,805,612 | Chapman | May 19, 1931 |
| 1,966,357 | Palmer | July 10, 1934 |